UNITED STATES PATENT OFFICE.

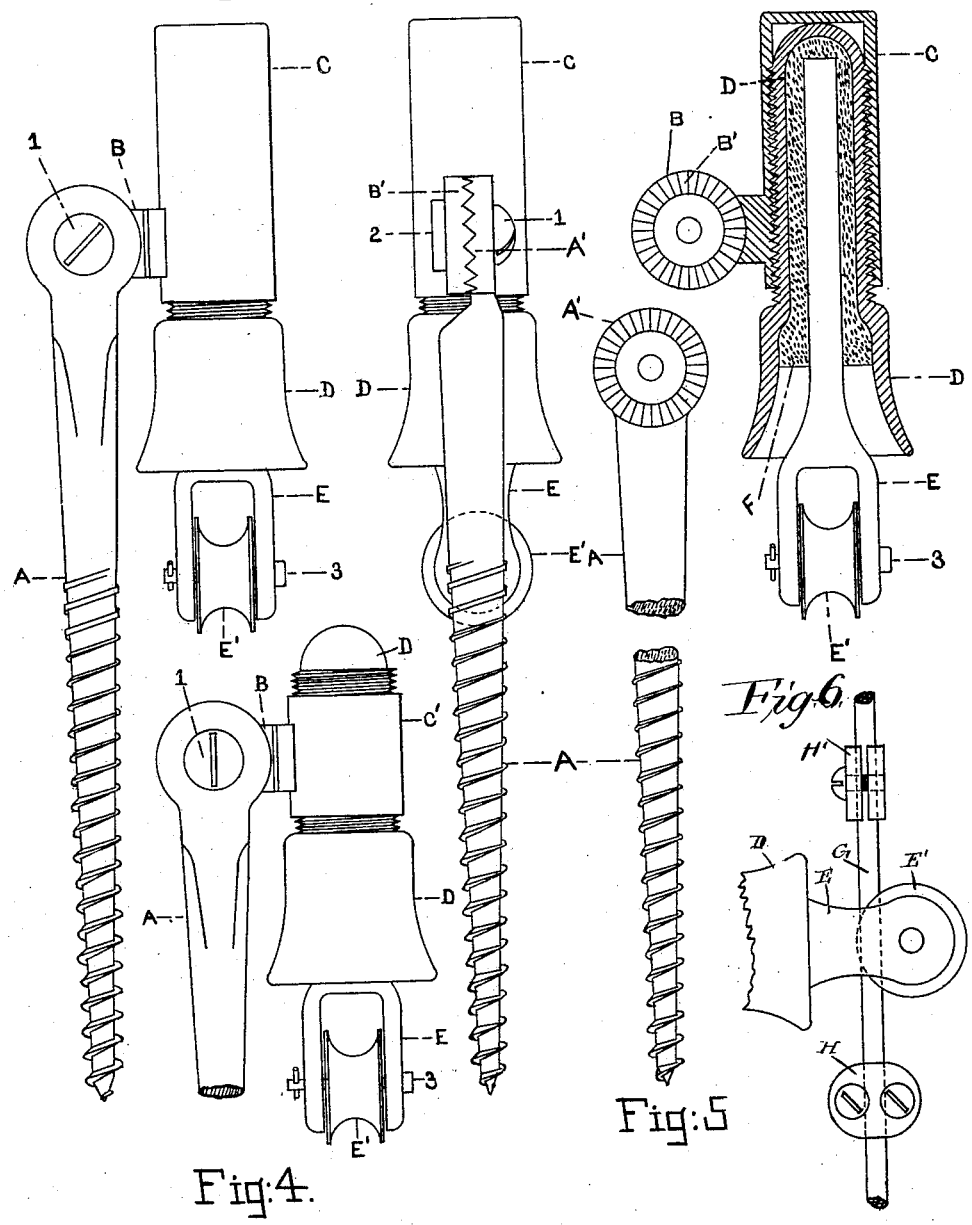

JOSEPH BRODIE SMITH, OF MANCHESTER, NEW HAMPSHIRE.

SUPPORT FOR ELECTRIC CONDUCTORS.

SPECIFICATION forming part of Letters Patent No. 418,766, dated January 7, 1890.

Application filed September 9, 1889. Serial No. 323,490. (No model.)

*To all whom it may concern:*

Be it known that I, JOSEPH BRODIE SMITH, of Manchester, New Hampshire, have invented a new and useful Insulating-Support for Electric Conductors, of which the following is a specification.

My invention relates to that class of insulating-supports which are used for trees and buildings; but it may be used also upon poles or otherwise.

My invention consists, first, in a metal cap or thimble having near its mouth a bracket or supporting-ear fitted to be bolted or otherwise attached to a screw, spike, cleat, or other supporter. This thimble or cap is threaded. Under some conditions the upper part or head of the cap may be omitted, so as to constitute only a band. This cap or band receives as the second part of my invention a device constructed of any proper non-conductor—such as hard rubber—somewhat bell-shaped, the part resembling the bell-handle being threaded to fit into the cap or band. The bell-shaped part should flare enough to allow any moisture or water collecting or falling upon it to fall free of the pulley, whose shank is fastened within the bell-shaped device by screw, cement, or other proper means. The pulley-wheel plays loosely upon its axle below the bell-shaped protector. The conducting-wire runs over this pulley, which may be easily duplicated. The bracket or ear attached to or forming part of the cap or band has a number of ratchets on its face which fit corresponding ratchets upon the head or shank of the screw or cleat, whereby any desired angle may be obtained and maintained without slipping.

Referring now to the accompanying drawings, Figure 1 is a side view of my invention, showing the insulator screwed into the thimble and the ear-piece attached to the screw which supports this device. Fig. 2 is a similar view after the device has been turned so as to bring the supporting-screw in front of the cap or thimble. Fig. 3 is a sectional view through Fig. 1, the supporting-screw being absent. Fig. 4 is like Fig. 1, showing, instead of a thimble, a metal band, which may be used in place of the thimble where less strength is required. Fig. 5 is a view of the supporting-screw, showing the ratchets by which the ear-piece can be adjusted and retained at any desired angle with the supporting-screw. Fig. 6 shows the roller and a portion of the line-wire, and also a stop to be affixed to the wire by a clamp, so that if the line-wire breaks such stop may prevent it running through the roller and dropping to the ground.

In the drawings, A represents a supporting-screw (which, if desired, may of course be a spike or bolt) to be inserted in the tree, building, or other means of support, having its head somewhat flattened on one side and partly cut away on the reverse side, as shown in Fig. 2, and provided with ratchets or teeth, as shown at A'.

B is an ear-piece upon or extending from the thimble C or band C', preferably constructed of brass or other metal, which ear-piece is also provided with ratchets B', to fit into the ratchets A' of the screw A, whereby the thimble C or cap may be adjusted and, by means of a bolt or screw 1, having the nut 2, be held in any position upon the screw A. The thimble C is preferably threaded on its inner surface. The band C' may be used instead of the thimble or cap C, if preferred.

D is a somewhat bell-shaped insulator-piece made of some insulating material—such as hard rubber—and is preferably threaded upon its outside to receive the thimble or cap C and permit the same to be turned as required.

E is a metallic pulley-shank embedded within the insulator D by means of any proper cement or filling F.

E' is the pulley-roller, turning on an axle 3.

G represents a wire or other electrical conductor for whose support my invention is designed.

H H' represent the stops to prevent the wire running through the roller in case of a break in the line.

The way of setting up and using my invention is as follows: The screw A is inserted in the given support—such as a tree—at any feasible angle. The ear-piece B is then set at such angle to A as to make the pulley-wheel perpendicular, and the nut 2 of the screw 1 is tightened, bringing the ratchets A' B' into gear, thereby firmly holding the rest of the device in position. If the pulley-wheel is not thus brought in the right line for the conductor, the threaded insulator-piece can be turned to accomplish this. This being accomplished, the telegraph, telephone, or other line-wire to be supported is passed over the roller of the pulley which supports the same. Of course the number of and distance between my supports will be determined as in the case of other supports for electrical or other lines or line-wires.

The advantages of my invention are numerous. In the first place, the bell-shaped insulator sheds all moisture or water, so that the tree or post cannot be brought into contact with the electricity by a water-circuit, as frequently happens. Again, the ratchets upon the respective faces of the supporting-screw and the ear allow the screw to be inserted in the tree at any angle and the cap or thimble to be adjusted perpendicularly. Again, if the insulator be threaded to screw into the thimble the roller may be accommodated to the direction of the line-wire which is to be supported.

I do not claim as my invention the bell-shaped insulator-piece D itself, as it is a well-known article, nor the use of a roller or wheel to support a line-wire; but What I do claim is—

1. An insulating-supporter for electric wires, consisting of a bolt or screw having a perforated head provided with ratchets upon its face, a thimble or cap having a perforated ear-piece provided with ratchets upon its face adjustable to those upon the screw-head, a fastening bolt and nut, an insulator adapted to be held in the thimble and having a bell-shaped or flaring mouth, a shank forked at one extremity to sustain a wheel or roller and its other end inserted and held in the insulator, and a wheel or roller sustained by the forked shank, substantially as described.

2. An adjustable insulating-support composed of a bolt whose head is perforated, flattened, and recessed, a metal thimble having an ear-piece perforated and recessed to fit the bolt-head, a bolt and nut for adjusting and fastening the ear-piece to the bolt-head, a bell-shaped insulator capable of attachment to the thimble, and a forked shank embedded in or fastened to the insulator, its forks supporting upon an axle a roller or wheel to support the line-wire, substantially as described.

3. In combination with a screw A, having a perforated flattened head and the ratchets A', and provided with a bolt and nut 1 2, the metal cap or thimble C, having a perforated ear-piece B, provided with the ratchets B', the non-conducting bell-shaped insulator D, and the forked shank E, supporting the roller E' and firmly held in the insulator D, substantially as described.

4. The combination of the screw A, having a flattened perforated head upon which are cut the ratchets A', and the nut 2 and bolt 1, with the cap or thimble C, having the perforated ear-piece B, upon which are cut the ratchets B', adjustable to the ratchets on said screw, for the purposes and substantially as described.

In witness whereof I hereunto subscribe my name, in presence of two witnesses, this 4th day of September, 1889.

J. BRODIE SMITH.

Witnesses:
L. B. CLOUGH,
F. C. TWOMBLY.